INVENTORS:
YOSHIHIRO NITTA
MINORU SHINDO
CHIFUYU ISONO
BY E. M. Squire
THEIR ATTY

United States Patent Office 3,280,119
Patented Oct. 18, 1966

3,280,119
SULFONAMIDE COMPOUND OF BENZOTHIADIAZINE SERIES AND PROCESS FOR PREPARING THE SAME
Yoshihiro Nitta, Tokyo, Minoru Shindo, Tokorozawa-shi, and Chifuyu Isono, Kawasaki-shi, Japan, assignors to Chugai Seiyaku, Kabushiki Kaisha, Tokyo, Japan, a corporation of Japan
Filed Jan. 26, 1965, Ser. No. 428,060
Claims priority, application Japan, Feb. 5, 1964, 39/5,716
2 Claims. (Cl. 260—243)

The present invention relates to a new sulfonamide compound of benzothiadiazine series and also to process for preparing the same. The essential feature of the present invention resides in the process for preparing said compound which comprises reacting 3-chloro-4,6-disulfamylaniline with methyl glyoxal.

The product of the present invention is new compound which has not yet reported in any literatures and which is useful as medicine having excellent diuretic action and sodium excretive action.

The structural formula of the present product may be assumed to be represented by the following two kinds of Formula, I or II:

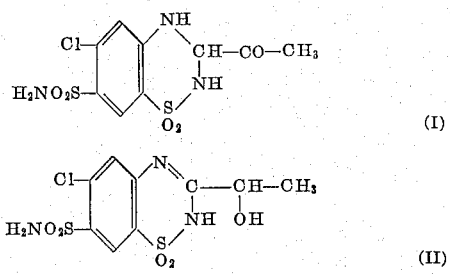

Figure 1:
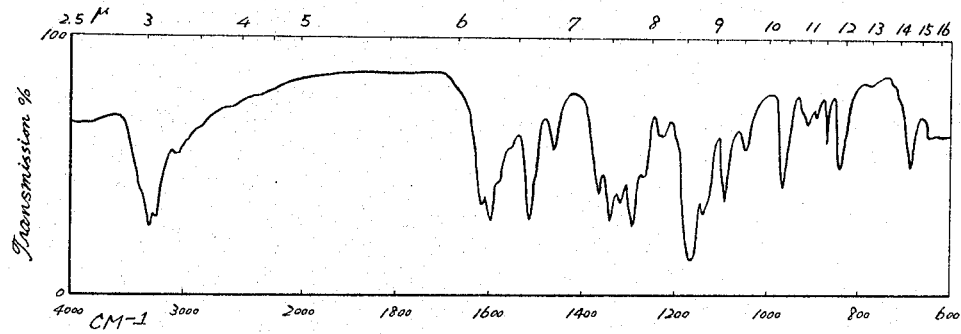
Figure 2:
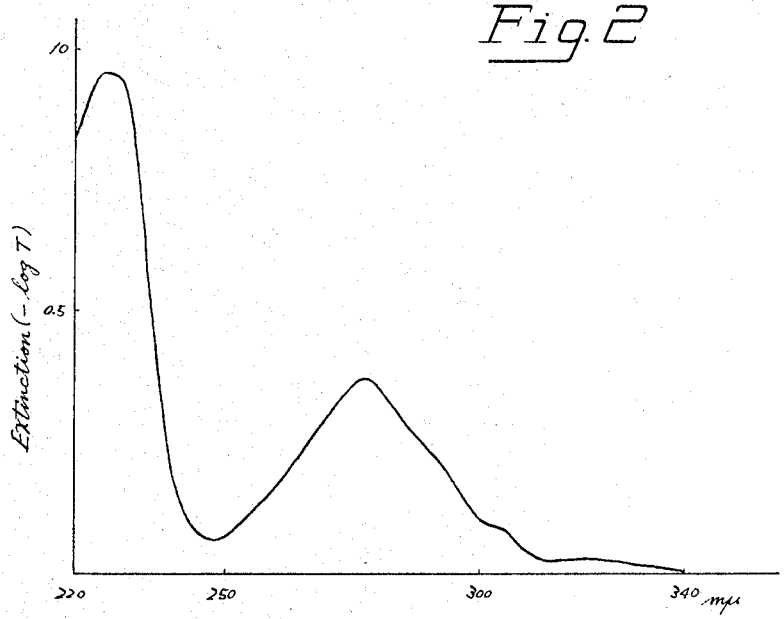

In the drawings, FIG. 1 shows an infrared absorption spectrum and
FIG. 2 shows an ultraviolet absorption spectrum of the product of the present invention.

As shown in FIG. 1 according to examination of the infrared absorption spectrum the present product shows disappearance of the keto group bond at 1650–1800 cm.$^{-1}$. And it shows, a strong absorption 1613 cm.$^{-1}$ in the infrared spectrum due to chlorothiazide, not hydrochlorothiazide. Therefore the present product presents existence of benzothiadiazine ring. Further, according to examination of the ultraviolet absorption spectrum shown in FIG. 2, the present product shows the absorptions at 227 mµ (peak), 278 mµ (middle shoulder), 303 mµ (weak shoulder), while chlorothiazide shows the absorptions at 227 mµ (peak), 278 mµ (peak), 291 mµ (middle shoulder), 302 mµ (weak shoulder) and hydrochlorothiazide at 227 mµ (peak), 272 mµ (peak), 320 mµ (weak, wide). That is to say the absorption spectrum of the present product is entirely identical with that of chlorothiazide but is different from that of hydrochlorothiazide. From the above reasons the chemical structure of the present product is proper to be represented by the Formula II so that the designatiion complying with this formula is used below.

On the practice of the present invention the reaction is preferable to be carried out in the presence of solvent, such as water, methanol, ethanol, dioxane. The reaction is accelerated by heating in water bath or oil bath. It is further advantageous to use condensation agent, for example, p-toluene sulfonic acid, hydrochloric acid, sulfuric acid and the like.

The present invention will be explained more in detail by way of example as follows:

EXAMPLE 1

To 200 cc. of dioxane was added 7.5 g. of 3-chloro-4,6-disulfamylaniline, 20 g. of 30% aqueous solution of methyl glyoxal and 1.2 g. of p-toluene sulfonic acid. The mixture was refluxed at 95°–105° C. for 20 hours in oil bath. About 150 cc. of solvent was distilled off. The crystals deposited by cooling the residual solution was collected by filtration. Recrystallization from 50% ethanol gave 4.7 g. of white needles of 6-chloro-3-α-hydroxyethyl-7-sulfamyl-1,2,4-benzothiadiazine - 1,1 - dioxide. Yield: 53%, M.P. 315° C. (decomp.).

Elemental analysis as $C_9H_{10}O_5N_3ClS_2$: Calc. percent, C, 31.81; H, 2.97; N, 12.37. Found: percent, C, 32.01; H, 3.14; N, 12.04.

EXAMPLE 2

A mixture of 5 g. of 3-chloro-4,6-disulfamylaniline, 25 g. of 30% aqueous methyl glyoxal solution. 5 cc. of ethanol and 25 cc. of concentrated hydrochloric acid was refluxed at 80–90° C. for 6 hours in water bath. After cooling, the crystals deposited were collected by filtration. Recrystallization from 50% ethanol gave 3.4 g. of the product of M.P. 315° C. (decompose), yield: 58%. The mixed melting point determination with the product which was obtained in Example 1 showed no depression.

EXAMPLE 3

A mixture of 3 g. of 3-chloro-4,6-disulfamylaniline, 3 g. of methyl glyoxal, 50 cc. of water and 5 cc. of concentrated sulfuric acid was heated at 90–98° C. for 3 hours on a water bath. After cooling the crystals deposited were collected by filtration. Recrystallization from 50% ethanol gave 2.2 g. of M.P. 315° C. (decomp.). The mixed melting point determination with the product which was obtained in Example 1 showed no depression. Yield: 62%.

We claim:
1. A compound of the formula

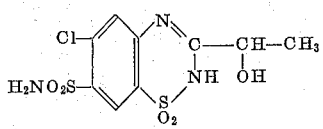

2. A process for preparing the compound of claim 1 which comprises reacting 3-chloro-4,6-disulfamylaniline with methyl glyoxal in a solvent in the presence of a condensation agent.

References Cited by the Examiner
UNITED STATES PATENTS
3,163,644  12/1964  De Stevens et al. ____ 260—243

NICHOLAS S. RIZZO, Primary Examiner.